(12) United States Patent
Falk

(10) Patent No.: US 9,265,202 B2
(45) Date of Patent: *Feb. 23, 2016

(54) PLANT CAGE KIT

(71) Applicant: Alexander J. Falk, Farmington, NY (US)

(72) Inventor: Alexander J. Falk, Farmington, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/568,259

(22) Filed: Dec. 12, 2014

(65) Prior Publication Data

US 2015/0245567 A1 Sep. 3, 2015

Related U.S. Application Data

(63) Continuation of application No. 14/193,870, filed on Feb. 28, 2014, now Pat. No. 8,935,879.

(51) Int. Cl.
*A01G 17/04* (2006.01)
*A01G 9/12* (2006.01)
*A01G 17/06* (2006.01)

(52) U.S. Cl.
CPC *A01G 9/12* (2013.01); *A01G 9/122* (2013.01); *A01G 9/124* (2013.01); *A01G 17/04* (2013.01); *A01G 17/06* (2013.01)

(58) Field of Classification Search
CPC .................. A01G 17/04; A01G 9/12
USPC ......................................... 47/70, 45
See application file for complete search history.

(56) References Cited

U.S. PATENT DOCUMENTS

| 185,263 | A | 12/1876 | Sands |
|---|---|---|---|
| 377,444 | A | 2/1888 | Watrous |
| 587,581 | A | 8/1897 | Horan |
| 1,377,832 | A | 5/1921 | Hanner |
| 1,617,494 | A | 2/1927 | Nuckols |
| 2,009,867 | A | 7/1935 | Ball |
| 2,014,175 | A | 9/1935 | Hart |
| 2,244,677 | A | 6/1941 | Cornell |
| 3,041,783 | A | 7/1962 | Pezdek |
| 3,264,783 | A | 8/1966 | Bayliss |
| 4,213,272 | A | 7/1980 | Nievelt |
| 4,503,636 | A | 3/1985 | Stuckey |
| 4,610,106 | A | 9/1986 | Robinson |
| 5,048,231 | A | 9/1991 | Brown |
| 5,452,681 | A * | 9/1995 | Ho .......................... A01K 31/08 119/461 |
| 5,595,019 | A | 1/1997 | Foreman |

(Continued)

FOREIGN PATENT DOCUMENTS

| JP | 09205896 | | 8/1997 |
|---|---|---|---|
| JP | 09205896 | A * | 8/1997 |

(Continued)

*Primary Examiner* — Son T Nguyen

(74) *Attorney, Agent, or Firm* — Nixon Peabody LLP

(57) ABSTRACT

A plant cage kit includes a wire grid, a bottom ring, and a top ring. The wire grid has a plurality of first and second spaced-apart wires. Each of the second wires is coupled to each of the first wires to form the wire grid. The first end of each second wire is formed into a loop and the second end of each second wire is formed into a hook. The hook of each second wire engages the loop of the same second wire when the plant cage kit is in the assembled configuration. When the plant cage kit is in the shipping configuration, the plurality of first wires is generally positioned in a first plane such that wire grid has a generally flat shape. The bottom and top rings have a generally U-shaped cross-section portion forming respective channels.

7 Claims, 11 Drawing Sheets

(56) References Cited

U.S. PATENT DOCUMENTS

| | | |
|---|---|---|
| 5,647,166 A | 7/1997 | Neff |
| 5,913,728 A | 6/1999 | Bal et al. |
| 6,385,901 B1 | 5/2002 | Wahlberg |
| 6,976,334 B1 | 12/2005 | Bowditch |
| 7,478,501 B2 | 1/2009 | Wilbanks et al. |
| D644,143 S | 8/2011 | Hollihan |
| 8,196,344 B1 * | 6/2012 | Roberts .................. A01G 9/12 47/25.1 |
| 8,272,160 B1 | 9/2012 | Hamann |
| 2002/0108303 A1 * | 8/2002 | Layton, Jr. ............... A01G 9/12 47/45 |
| 2012/0159844 A1 * | 6/2012 | Davis ..................... A01G 9/12 47/45 |

FOREIGN PATENT DOCUMENTS

| | | | | |
|---|---|---|---|---|
| JP | 11178458 | | | 7/1999 |
| JP | 11178458 | A | * | 7/1999 |
| JP | 2002065074 | | | 3/2002 |
| JP | 2002065074 | A | * | 3/2002 |
| JP | 2005185127 | | | 7/2005 |
| JP | 2005185127 | A | * | 7/2005 |
| JP | 2006000107 | | | 1/2006 |
| JP | 2006000107 | A | * | 1/2006 |

* cited by examiner

PLANT CAGE KIT

This application is a continuation of prior application Ser. No. 14/193,870, filed Feb. 28, 2014, which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present disclosure relates generally to plant cages and, more particularly, to a kit having components capable of being shipped in a relatively flat box and assembled into a generally circular plant cage.

BACKGROUND

Plant cages are typically preformed into cone shapes or generally cylindrical shapes and sold at stores as such. These preassembled plant cages make it difficult for the average consumer or farmer to transport large amounts of the preassembled plant cages because of the volume taken up by the plant cages. While some known plant cages are stackable, even these stackable plant cages require large volumes of space for transporting. Further, known preassembled plant cages are typically made of metal wires and have several sharp points protruding from the assembled cages. As such, transporting such cages in a front or back seat of a car or truck runs the risk of the preassembled plant cage piercing the fabric of the vehicle. The present disclosure is directed toward solving these and other problems.

SUMMARY OF THE INVENTION

According to some implementations of the present disclosure, a plant cage kit having an assembled configuration and a shipping configuration includes a wire grid, a bottom ring, and a top ring. The wire grid has a plurality of first spaced-apart wires and a plurality of second spaced-apart wires. Each of the second wires is coupled to each of the first wires to form the wire grid. Each of the second wires has a first end and a second end opposing the first end. The first end of each second wire is formed into a loop and the second end of each second wire is formed into a hook. The hook of each second wire engages the loop of the same second wire when the plant cage kit is in the assembled configuration. When the plant cage kit is in the shipping configuration, the plurality of first wires is generally positioned in a first plane, the loops thereof are generally positioned in the first plane, and the hooks thereof are generally positioned in a second plane that is generally perpendicular to the first plane. The bottom ring has a generally U-shaped cross-section portion forming a channel such that in the assembled position a bottom one of the second wires is substantially positioned within the channel of the bottom ring. The top ring has a generally U-shaped cross-section portion forming a channel such that in the assembled position a top one of the second wires is substantially positioned within the channel of the top ring.

According to some implementations of the present disclosure, a plant cage kit having an assembled configuration and a shipping configuration includes a wire grid, a bottom ring, and a top ring. The wire grid has a plurality of first spaced-apart wires and a plurality of second spaced-apart wires. Each of the second wires is coupled to each of the first wires to form the wire grid. Each of the second wires has a first end and a second end opposing the first end. The first end of each second wire is formed into a loop and the second end of each second wire is formed into a hook. The hook of each second wire engages the loop of the same second wire when the plant cage kit is in the assembled configuration. When the plant cage kit is in the shipping configuration, the plurality of first wires is generally positioned in a first plane, the hooks are generally positioned in the first plane, and the loops are generally positioned in a second plane that is generally perpendicular to the first plane. The bottom ring has a generally U-shaped cross-section portion forming a channel. The channel of the bottom ring has a bulge portion. The bulge portion of the channel of the bottom ring includes an aperture therein. In the assembled position a bottom one of the second wires is substantially positioned within the channel of the bottom ring such that the loop of the bottom one of the second wires is at least partially positioned within the bulge portion of the channel of the bottom ring and such that the hook of the bottom one of the second wires extends through the aperture. The top ring has a generally U-shaped cross-section portion forming a channel. The channel of the top ring has a bulge portion. In the assembled position a top one of the second wires is substantially positioned within the channel of the top ring such that the loop of the top one of the second wires is at least partially positioned within the bulge portion of the channel of the top ring.

According to some implementations of the present disclosure, a plant cage kit having an assembled configuration and a shipping configuration includes a wire grid, a bottom ring, and a top ring. The wire grid has a plurality of first spaced-apart wires and a plurality of second spaced-apart wires. Each of the second wires is coupled to each of the first wires to form the wire grid. Each of the second wires has a first end and a second end opposing the first end. The first end of each second wire is formed into a loop and the second end of each second wire is formed into a hook. The hook of each second wire engages the loop of the same second wire when the plant cage kit is in the assembled configuration such that the wire grid has a generally curved shape. When the plant cage kit is in the shipping configuration, the plurality of first wires is generally positioned in a first plane such that wire grid has a generally flat shape. The bottom ring has a generally U-shaped cross-section portion forming a channel such that in the assembled position a bottom one of the second wires is substantially positioned within the channel of the bottom ring. The top ring has a generally U-shaped cross-section portion forming a channel such that in the assembled position a top one of the second wires is substantially positioned within the channel of the top ring.

Additional aspects of the present disclosure will be apparent to those of ordinary skill in the art in view of the detailed description of various implementations, which is made with reference to the drawings, a brief description of which is provided below.

Figure 1A:
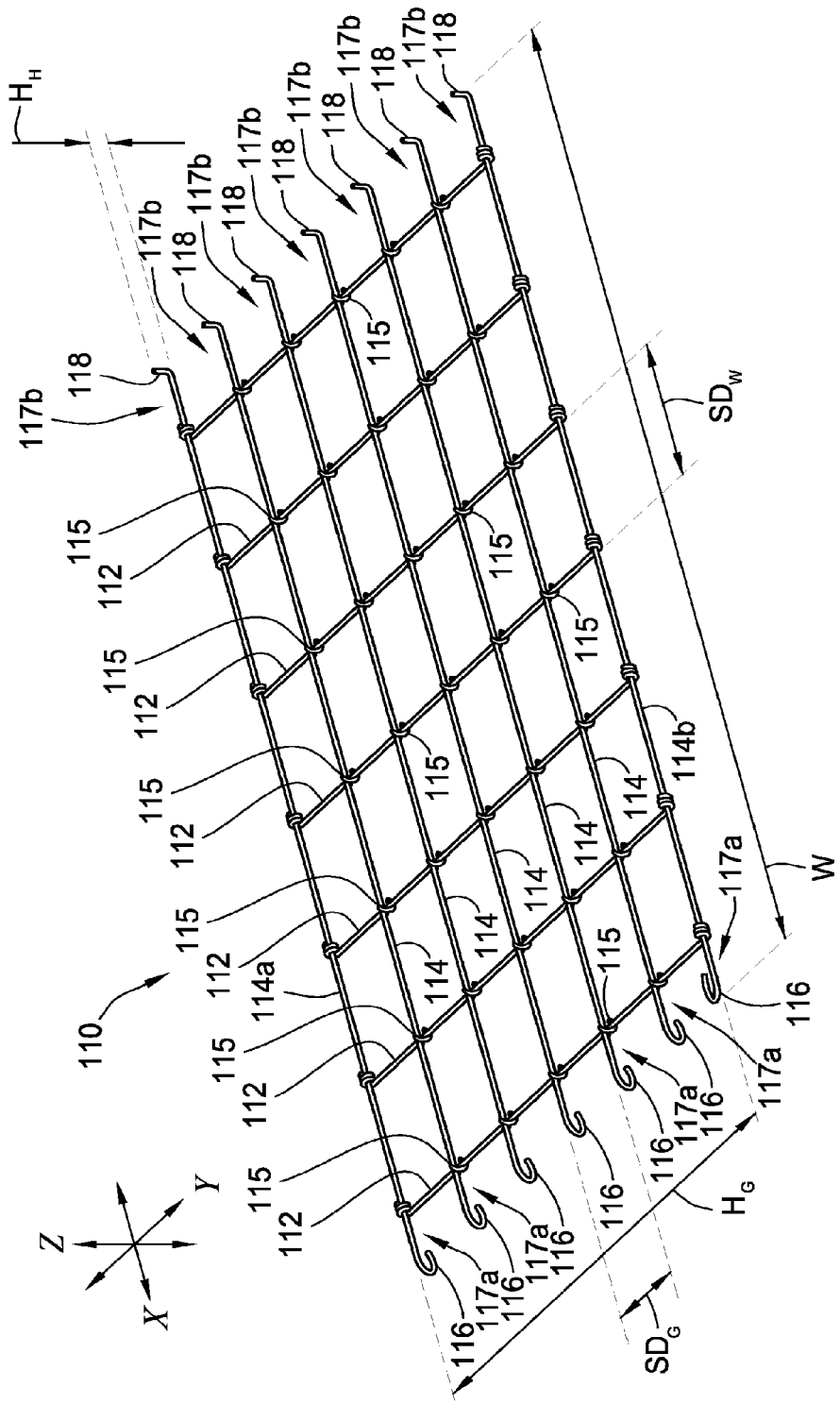
FIG. 1A is a perspective view of a wire grid of a plant cage kit of FIG. 4A according to some aspects of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is intended to cover all modifications, equivalents, and alternatives falling within the spirit and scope of the present disclosure as defined by the appended claims.

DETAILED DESCRIPTION

While this disclosure is susceptible of embodiment in many different forms, there is shown in the drawings and will herein be described in detail preferred implementations of the disclosure with the understanding that the present disclosure is to be considered as an exemplification of the principles of the disclosure and is not intended to limit the broad aspect of the disclosure to the implementations illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

A first plant cage kit is described in reference to FIGS. 1A, 2A, 3A, and 4A having a single wire grid portion. A second plant cage kit is described in reference to FIG. 5A that is similar to the plant cage kit of FIGS. 1A, 2A, 3A, and 4A, where like reference numbers are used for like components, except that the wire grid of FIG. 5A has two separate and distinct portions that are joined by an intermediate ring described below. A third plant cage kit is described in reference to FIGS. 1B, 2B, 3B, and 4B that is similar to the plant cage kit of FIGS. 1A, 2A, 3A, and 4A, where like reference numbers are used for like components, except that the hooks and loops of the wire grid of FIGS. 1B, 2B, 3B, and 4B have different relative positions as compared to the hooks and loops of the wire grid of the implementation of FIGS. 1A, 2A, 3A, and 4A and the top and bottom rings include additional features (e.g., a bulge portion, an aperture). A fourth plant cage kit is described in reference to FIG. 5B that is similar to the plant cage kit of FIGS. 1B, 2B, 3B, and 4B, where like reference numbers are used for like components, except that the wire grid of FIG. 5B has two separate and distinct portions that are joined by an intermediate ring described below. The plant cage kits of FIGS. 5A and 5B can be used, for example, to support pole beans that can grow to great heights. The plant cage kits of FIGS. 1A-4B can be used, for example, to support tomato plants. Tomatoes are relatively heavy fruits, so the plant cage kit is configured to support the growth of tomatoes without breaking or drooping while allowing the tomato plants to remain upright without toppling over or titling to one side, even in adverse weather conditions including high winds. The plant cage kits of the present disclosure are not limited to any particular fruit or vegetable or plant, but tomatoes and pole beans are identified as non-exhausted examples of suitable types of plants that can be supported by the plant cage kits described herein. The plant cage kits of the present disclosure advantageously remain stably anchored to the ground, do not lean or topple over even when laden with fruit (or other plants) or during high winds, can be stacked without losing stability, are easy to transport and assemble and disassemble using only a few parts, and maintain their shape and rigidity, to name a few.

Figure 2A:
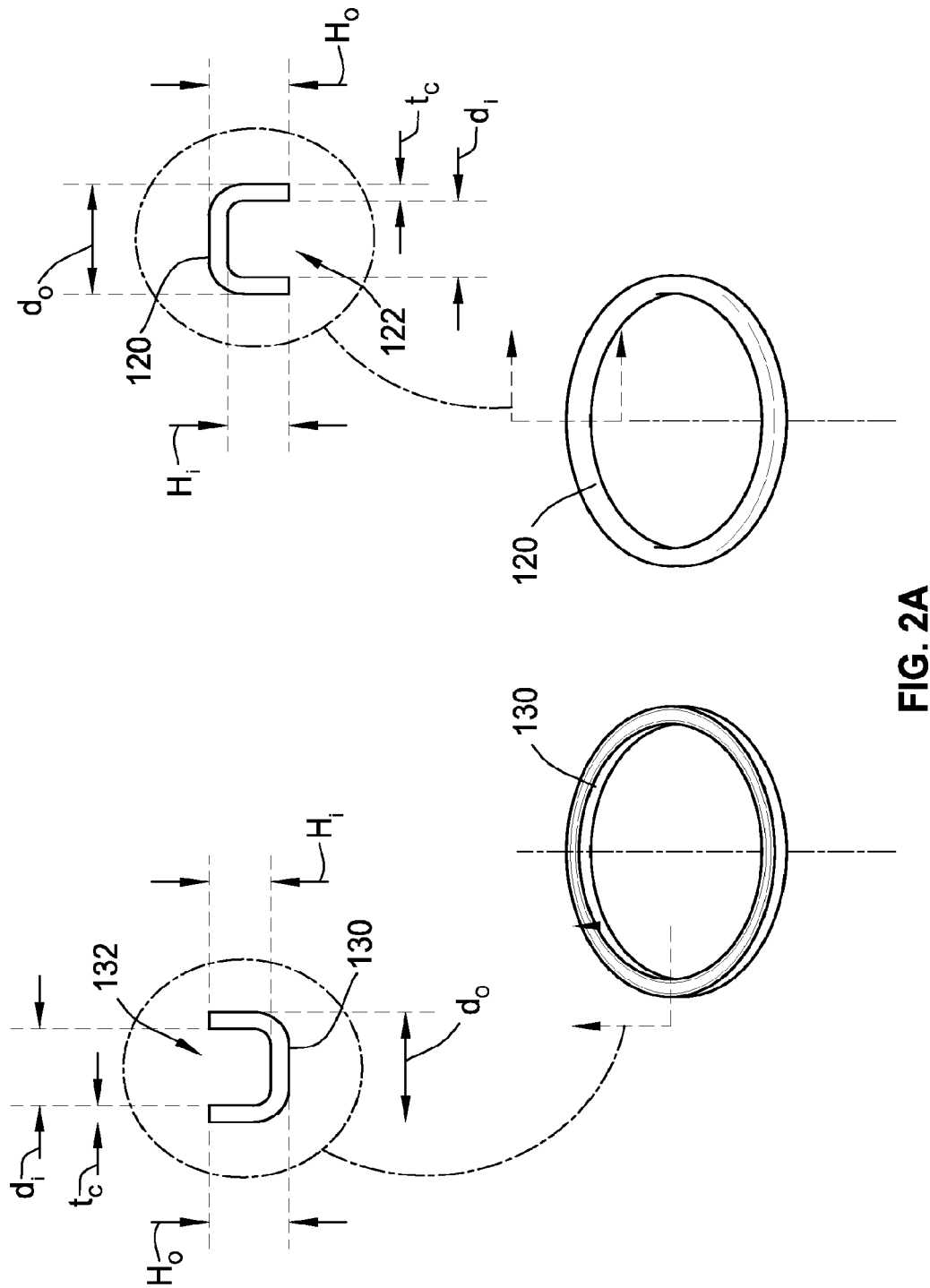
FIG. 2A is a perspective view of a top and bottom ring of the plant cage kit of FIG. 4A.
Figure 3A:
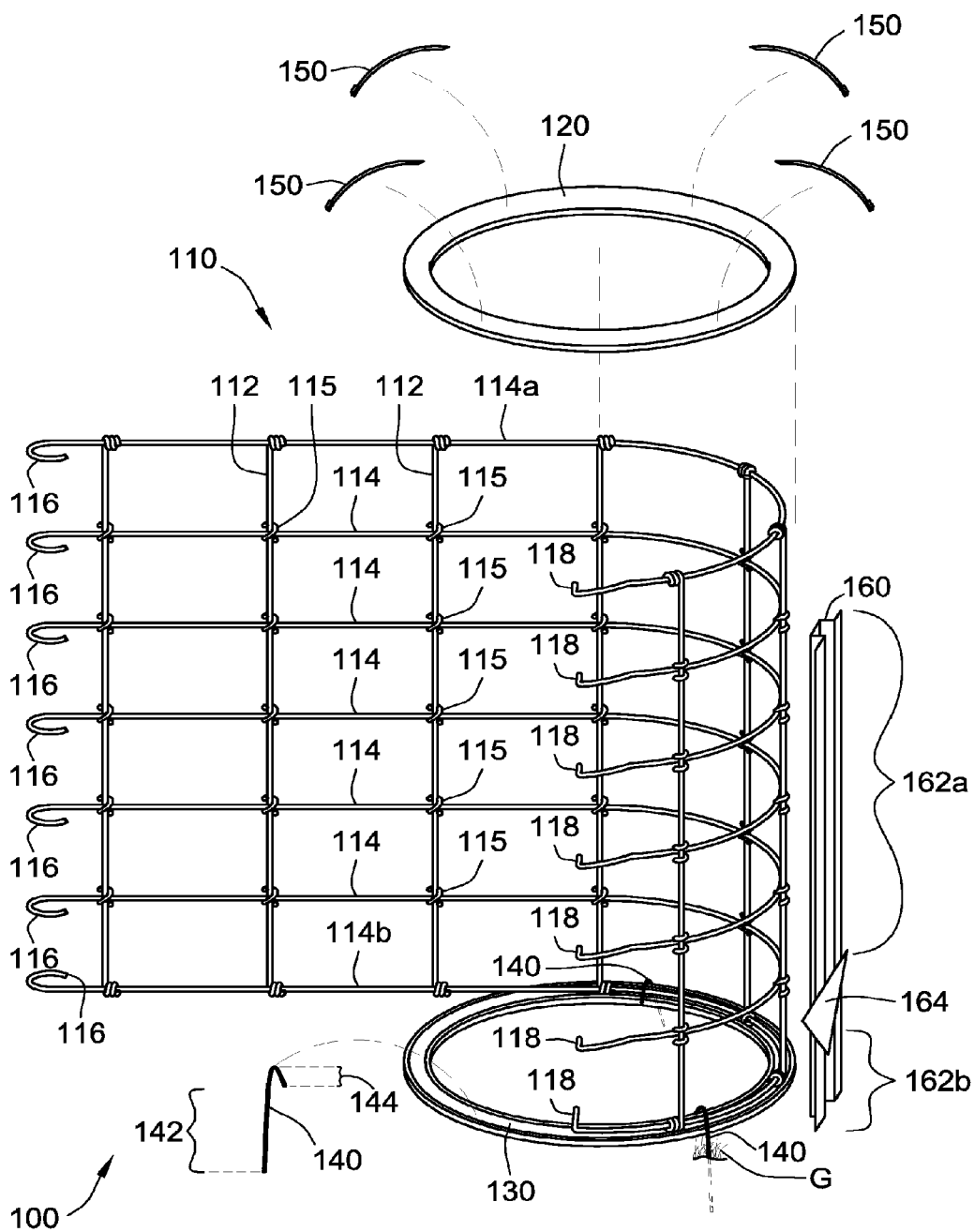
FIG. 3A is a partially exploded perspective view of the plant cage kit of FIG. 4A.
Figure 4A:
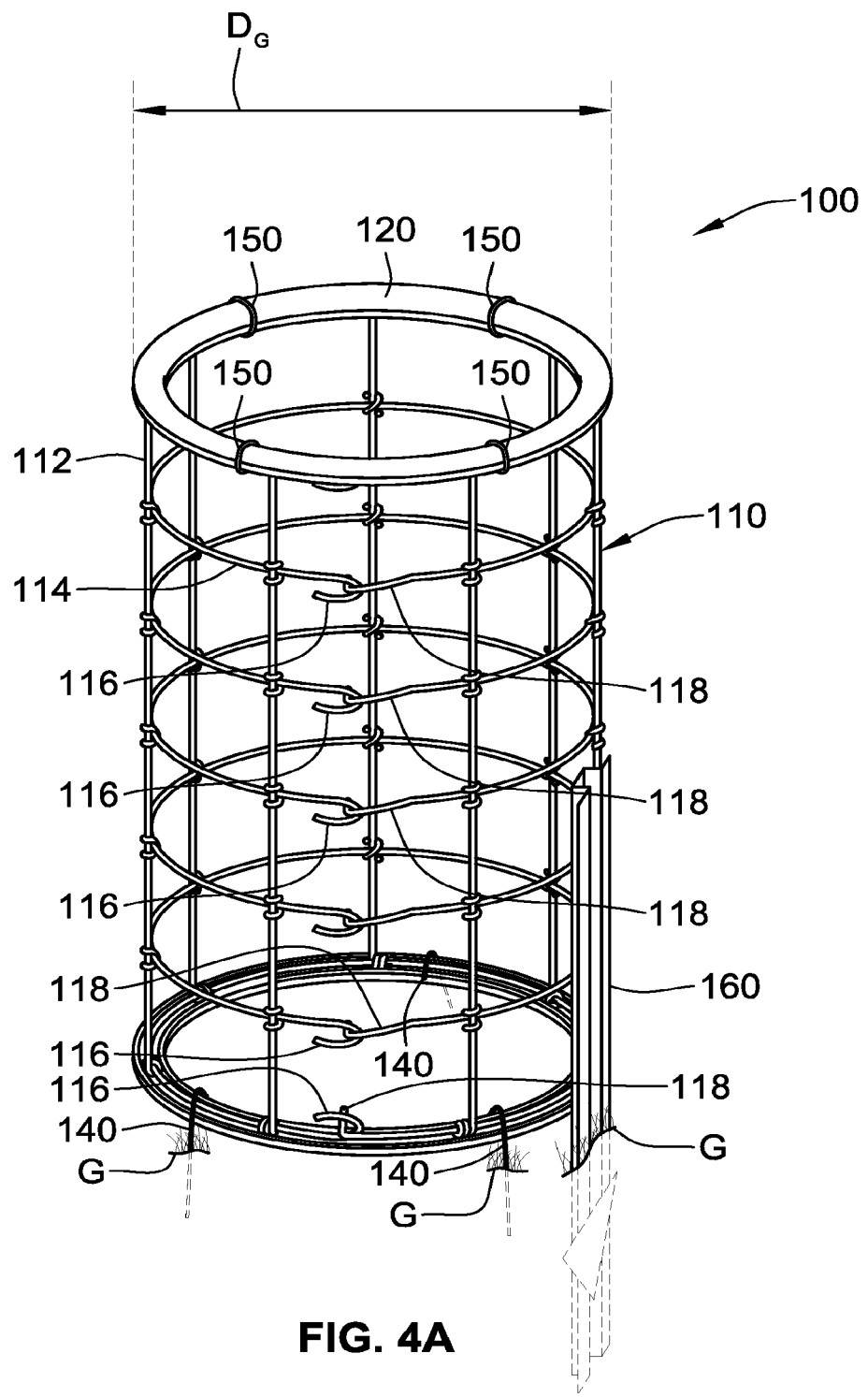
FIG. 4A is an assembled perspective view of a plant cage kit according to some aspects of the present disclosure.

Referring generally to FIGS. 1A, 2A, 3A, and 4A, a plant cage kit 100 (shown in its assembled configuration in FIG. 4A and partially exploded in FIG. 3A) includes a wire grid 110 (FIGS. 1A, 3A, 4A), a top ring 120 (FIGS. 2A, 3A, 4A), a bottom ring 130 (FIGS. 2A, 3A, 4A), a plurality of cage stakes 140 (FIGS. 3A, 4A), a plurality of fastening elements 150 (FIGS. 3A, 4A), and a garden stake 160 (FIGS. 3A, 4A). While the plant cage kit 100 is shown in its assembled configuration in FIG. 4A, the plant cage kit 100 is shipped and/or shippable in a shipping configuration/unassembled configuration (e.g., shown in FIG. 6) where the components of the plant cage kit 100 are generally flat and stacked making the plant cage kit 100 easier for a consumer to transport and/or carry.

Referring specifically to FIG. 1A, the wire grid 110 is shown in its preassembled configuration and/or in its shipping configuration. In the shipping configuration, the wire grid 110 has a generally flat shape, compared to its assembled configuration (FIG. 4A) where the wire grid 110 has a generally curved shaped (e.g., cylindrical shape). The wire grid 110 includes a multitude of first spaced-apart wires 112 and a multitude of second spaced-apart wires 114. In the assembled configuration (FIG. 4A), the first wires 112 are generally vertical and the second wires 114 are generally horizontal (FIG. 4A); however, the first and the second wires 112 and 114 can have any orientation (e.g., diagonal, crisscross, etc.) and can form a diamond-shaped or lattice or square or rectangular spacing pattern, for example.

The first wires 112 and/or the second wires 114 can be made from any material, such as, for example, metal (e.g., galvanized wire mesh, steel, aluminum, copper), plastic, or any combination thereof. The first and the second wires 112, 114 can have the same gauge or thickness. Alternatively, some of the first wires 112 and/or some of the second wires 114 have a first gauge or thickness that is different than the gauge or thickness of the other wires. For example, the top most second wire 114a and the bottom most second wire 114b can be of a first gauge (e.g., 10 gauge) and the rest of the second wires 114 and the first wires 112 can be of a second gauge (e.g., 12 gauge).

As best shown in FIG. 1A, each of the second wires 114 is coupled to each of the first wires 112 to form the wire grid 110. Specifically, each of the first wires is coupled to the top most second wire 114a by being coiled therearound. Similarly, each of the first wires 112 is coupled to the bottom most second wire 114b by being coiled therearound. Further, each of the first wires 112 is coupled to the rest of the second wires 114, such as, for example, by a wire knot 115. As best shown in FIG. 3A, each of the wire knots 115 includes a piece of wire that has a generally figure-eight shape that is bent into a generally C-shape. As such, during the assembly of the wire grid 100, the first wires 112 can be threaded through the openings of the figure eight portion and the second wires 114 can be threaded between the first wires 112 and the center portion of the bent wire knots 115. Alternatively, the wire knot 115 can be a piece of wire that is tied and/or bent around the first and the second wires 112, 114 when positioned in a crisscross or intersecting fashion. Various alternative methods for coupling the first and the second wires 112 and 114 together are possible and contemplated herein (e.g., welding, cable ties, coiling, etc.).

Each of the second wires 114 has a first end 117a and an opposing second end 117b. The first end 117a of each second wire 114 is formed into a loop 116 (e.g., a U-shaped loop, a P-shaped loop, a V-shaped loop, an 0-shaped loop, etc.) and the second end 117b of each second wire 114 is formed into a hook 118 (e.g., an L-shaped hook, etc.). As shown in FIG. 4A, the hooks 118 of each second wire 114 engage the loops 116 of the same second wire 114 when the plant cage kit 100 is in the assembled configuration. As best shown in FIG. 1A, when the plant cage kit 100 is in the shipping configuration, the first wires 112 are generally positioned in a first plane (e.g., the X-Y plane), the loops 116 of the second wires 114 are generally positioned in the first plane (e.g., the X-Y plane), and the hooks 118 of the second wires 114 are generally positioned in a second plane (e.g., the Y-Z plane) that is generally perpendicular to the first plane (e.g., the X-Y plane). With reference to FIGS. 3A and 4A, the positioning of the loops 116 and hooks 118 in such generally perpendicular planes aids in the maintaining of the wire grid 110 in its assembled configuration (FIG. 4A) as the hooks 118 are positioned to engage the loops 116 (FIG. 4A).

Referring to FIG. 1A, in the shipping configuration, the wire grid 110 has a height, $H_g$, between about one foot and about five feet. In some implementations, in the shipping configuration, the wire grid 110 has a height, $H_g$, between about two feet and about four feet. In some other implementations, in the shipping configuration, the wire grid 110 has a height, $H_g$, of about three feet. In yet some other implementations, in the shipping configuration, the wire grid 110 has a height, $H_g$, of about one and a half feet. In the shipping configuration, the wire grid 110 has a width, W, between about three feet and about six feet. In some implementations, in the shipping configuration, the wire grid 110 has a width, W, of about four and a half feet. The hooks 118 have a height, $H_h$, between about half an inch and about three inches. In some other implementations, the hooks have a height, $H_h$, between about one inch and two inches. In the shipping configuration, each of the first wires 112 are spread apart from one another by a spread distance, $SD_w$, between about one inch and about ten inches, but more preferably between about three inches and about eight inches. For example, the opening between wires should be large enough to allow a human hand to reach through to pluck tomatoes or other fruits or vegetables from the plant growing inside the plant cage, but small enough to allow the plant cage to remain in a rigid, upright state even during high winds and even when loaded with heavy tomato fruit. In some implementations, in the shipping configuration, each of the first wires 112 are spread apart from one another by a spread distance, $SD_w$, of about six inches. In the shipping configuration, each of the second wires 114 are spread apart from one another by a spread distance, $SD_h$, between about one inch and about ten inches, but more preferably between about three inches and about eight inches. In some implementations, in the shipping configuration, each of the second wires 114 are spread apart from one another by a spread distance, $SD_h$, of about six inches. As shown in FIG. 4A, in the assembled configuration, the wire grid 110 has a diameter, $D_g$, between about one foot and about two feet. In some alternative implementations, in the assembled configuration, the wire grid 110 has a diameter, $D_g$, between about 1.2 feet and about 1.6 feet. In some other implementations, in the assembled configuration, the wire grid 110 has a diameter, $D_g$, of about 1.4 feet. The dimensions listed herein are exemplary and are not intended to limit all implementations of the present disclosure; however, the dimensions of the plant cage kit 100 should be selected such that in the assembled configuration, the plant cage kit 100 is suitable for supporting a plant positioned therein, such as, for example, a tomato plant, a pole bean plant, etc. Further, the dimensions of the plant cage kit 100 should be selected such that in the shipping configuration (e.g., FIG. 6), the plant cage kit 100 is suitable for transporting in a standard consumer automobile, truck, etc. and/or relatively easy for a single person to carry the plant cage kit 100 in a shipping box (e.g., not too large in any one dimension to grab/hold the shipping box).

Referring to FIG. 2A, the top ring 120 and the bottom ring 130 are shown as being substantially identical and in some implementations can be identical. As shown in FIG. 2A, the top ring 120 and the bottom ring 130 both have a generally U-shaped cross-section. The U-shaped cross-section of the top ring 120 forms a channel 122. The channel 122 is sized and positioned such that, in the assembled position (FIG. 4A), the top most second wire 114a (FIGS. 1A, 3A) is substantially positioned within the channel 122. The top ring 120 has an outside height, $H_o$, between about half an inch and about three inches, but more preferably between about one inch and two inches. The top ring 120 has an inside height, $H_i$, between about a quarter of an inch and about two and a half inches, but more preferably between about a half inch and one and half inches. Further, the top ring 120 has an outside diameter, $d_o$, between about half an inch and about three inches, but more preferably between about one inch and two inches. The top ring 120 has an inside diameter, $d_i$, between about a quarter of an inch and about two and a half inches, but more preferably between about a half inch and one and a half inches. In some implementations, the thickness, $t_c$, of the channel 122 is between about a quarter of an inch and one inch, but more preferably about half an inch in thickness.

Similarly, as shown in FIG. 2A, the U-shaped cross-section of the bottom ring 130 forms a channel 132. The channel 132 is sized and positioned such that, in the assembled position (FIG. 4A), the bottom most second wire 114b (FIGS. 1A, 3A) is substantially positioned within the channel 132. The bottom ring 130 has an outside height, $H_o$, an inside height, $H_i$, an outside diameter, $d_o$, an inside diameter, $d_i$, and a thickness, $t_c$, that are the same as, or similar to, the dimensions discussed in reference to the top ring 120, where like dimensional references are used for like dimensions.

Figure 2B:
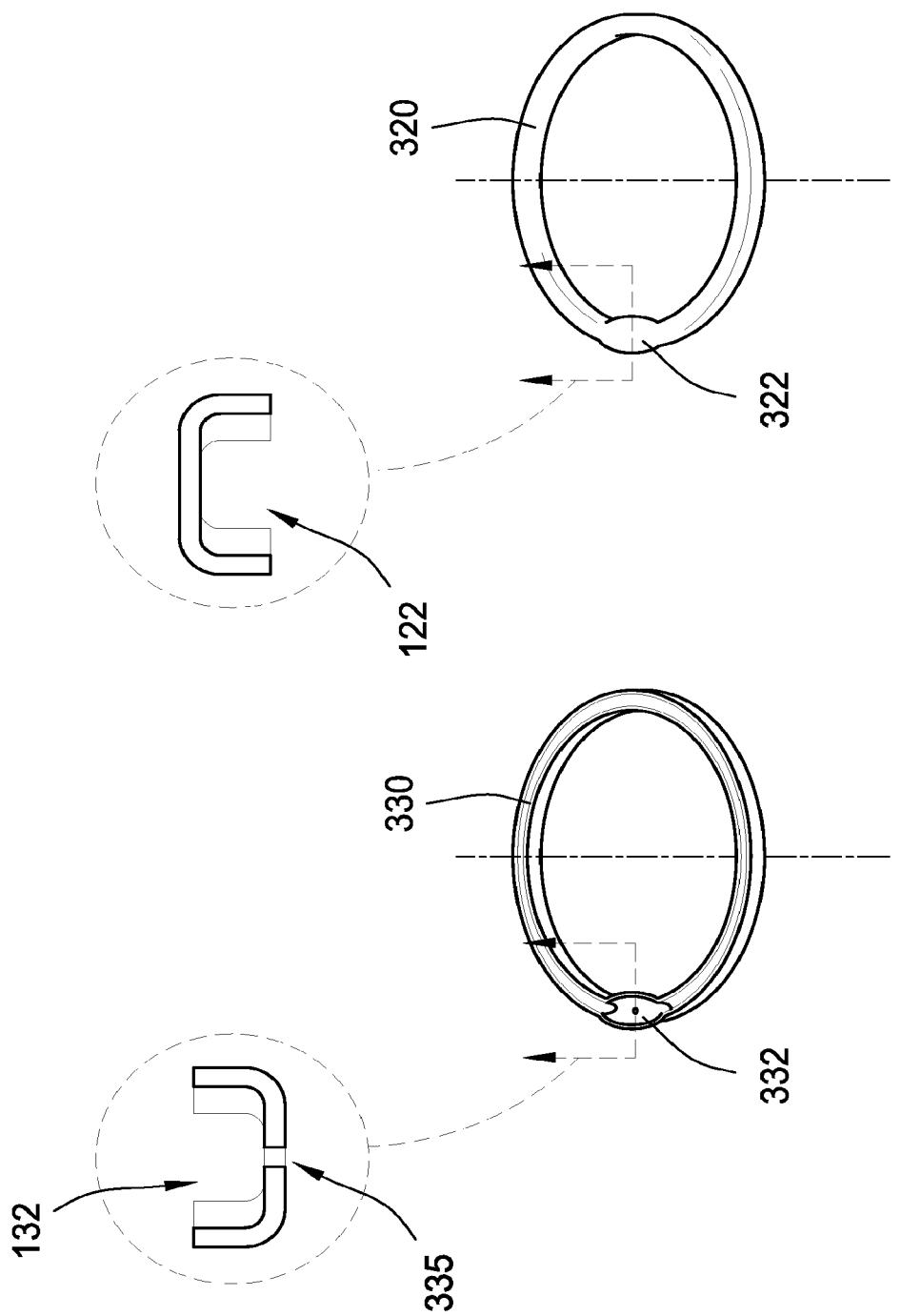
FIG. 2B is a perspective view of a top and bottom ring of the plant cage kit of FIG. 4B.

The top ring 120 and the bottom ring 130 can be made from any material, such as, for example, metal (e.g., steel, aluminum, copper), plastic, rubber, or any combination thereof. While the cross-section of the top ring 120 and the cross-section of the bottom ring 130 are shown as being substantially constant along the circumference of the top and the bottom rings 120, 130, the cross-section can be varied at any point or points along the circumference of the top ring 120 and/or the bottom ring 130 (e.g., a bulge portion can be included as shown in FIG. 2B and as described herein). The top ring 120 and/or the bottom ring 130 aid in maintaining the shape and cylindrical structure of the plant cage kit 100. The bottom ring 130 aids in assembling the plant cage, as it provides the channel 132 into which to insert the ends of the wire grid 110 as it is bent into a round shape. Without the bottom ring 130, bending the wire grid 110 into a cylindrical shape can be an awkward, frustrating task. Thanks in part to the top ring 120 and the bottom ring 130, the plant cage kits 100 can maintain its shape even when laden with fruit (or other heavy plants) and even during high winds.

Referring to FIG. 3A, three cage stakes 140 are shown, however, any number of cage stakes 140 can be included in the plant cage kit 100 (e.g., one, two, four, five, ten, etc.). The more cage stakes 140 used during installation/assembly of the plant cage kit 100, the more rigid the connection of the plant cage kit 100 with the ground G receiving the plant cage kit 100. Each of the cage stakes 140 has a body portion 142 and a hook portion 144 (FIG. 3A). The tip of the body portion 142 can be pointed to aid in the insertion of the cage stake 140 into the ground G. Alternatively, the tip of the cage stakes 140 can be flat, rounded, or any other shape.

During installation of the plant cage kit 100, the hook portion 144 of the cage stake 140 is generally positioned above the bottom second wire 114b and the bottom ring 130. The body portion 142 of the cage stake 140 is then pressed into the ground G a sufficient distance (e.g., five to eight inches)—using for example a sledge hammer, the assembler's foot, etc.—such that the hook portion 144 engages and/or contacts an upper portion of the bottom ring 130 as shown in FIG. 4A. As such, the cage stakes 140 hold the plant cage kit 100 in engagement with the ground G, thereby adding rigidity to the plant cage kit 100 in its assembled configuration (FIG. 4A). Further the cage stakes 140 prevent the plant cage kit 100 from falling or blowing over when a plant is positioned therein. The cage stakes 140 can be made from any rigid material, such as, for example, metal (e.g., steel, aluminum, copper), plastic, or any combination thereof.

In order to convert the plant cage kit 100 from the shipping configuration (e.g., FIG. 6) to the assembled configuration (FIG. 4A), the bottom ring 130 is positioned on the ground G with the channel 132 facing upward, as shown in FIG. 3A. Then, one end of the wire grid 110 is positioned in the channel 132. The assembler (not shown) then bends the wire grid 110 from its flat configuration (FIG. 1A) into a curved configuration (e.g., as shown in FIG. 4A). In order to aid in such a bending process, the assembler can use the channel 132 to help guide the wire grid 110 into the proper curved configuration. As the assembler bends the wire grid 110 into and/or along the channel 132, the assembler can position and install the cage stakes 140 one at a time, thereby aiding in maintaining the wire grid 110 in position as the rest of the wire grid 110 is bent and/or converted into the curved configuration (FIG. 4A). When the wire grid 110 is fully bent into the curved configuration (FIG. 4A), the assembler then engages each of the hooks 118 with a corresponding one of the loops 116 to hold the wire grid 110 in the assembled position (FIG. 4A). In some implementations, the hooks 118 are merely positioned within the loops 116, yet in other implementations, the hooks are positioned within the loops 116 and then bent (e.g., using a tool like a pliers) to further maintain the wire grid 110 in the assembled configuration.

After the wire grid 110 is bent into its assembled configuration (FIG. 4A), the top ring 120 is positioned on the top second wire 114a. To further add rigidity to the plant cage kit 100 in the assembled configuration, one or more fastening elements 150 can be positioned and/or tied around the top ring 120 and the top second wire 114a as shown in FIG. 4A. The fastening elements 150 can be, for example, cable ties, wire, string, tape, etc.

To further add rigidity to the plant cage kit 100, the garden stake 160 can be installed next to the wire grid 110 as shown in FIG. 4A. The term "garden stake" as used herein has a meaning as understood by those skilled in the art of gardening. As best shown in FIG. 3A, the garden stake 160 includes a first shaft portion 162a, a second shaft portion 162b, and a stopper portion 164 positioned between and/or on the first and the second shaft portions 162a,b. To install the garden stake 160, the assembler inserts the garden stake partially into the ground G such that the second shaft portion 162 first enters the ground G and such that the stopper portion 164 at least partially enters into the ground G. A sledge hammer and/or the assembler's foot can be used for such an installation. The first shaft portion 162a remains above the ground G next to the curved wire grid 110. The garden stake 160 is positioned relative to the wire grid 110 such that the garden stake 160 aids in supporting the wire grid 110 against lateral forces (e.g., blowing wind, etc.). In some implementations, the garden stake 160 is coupled to a portion of the wire grid 110 (e.g., using one or more fastening elements) to further aid in supporting the wire grid 110.

Figure 5A:
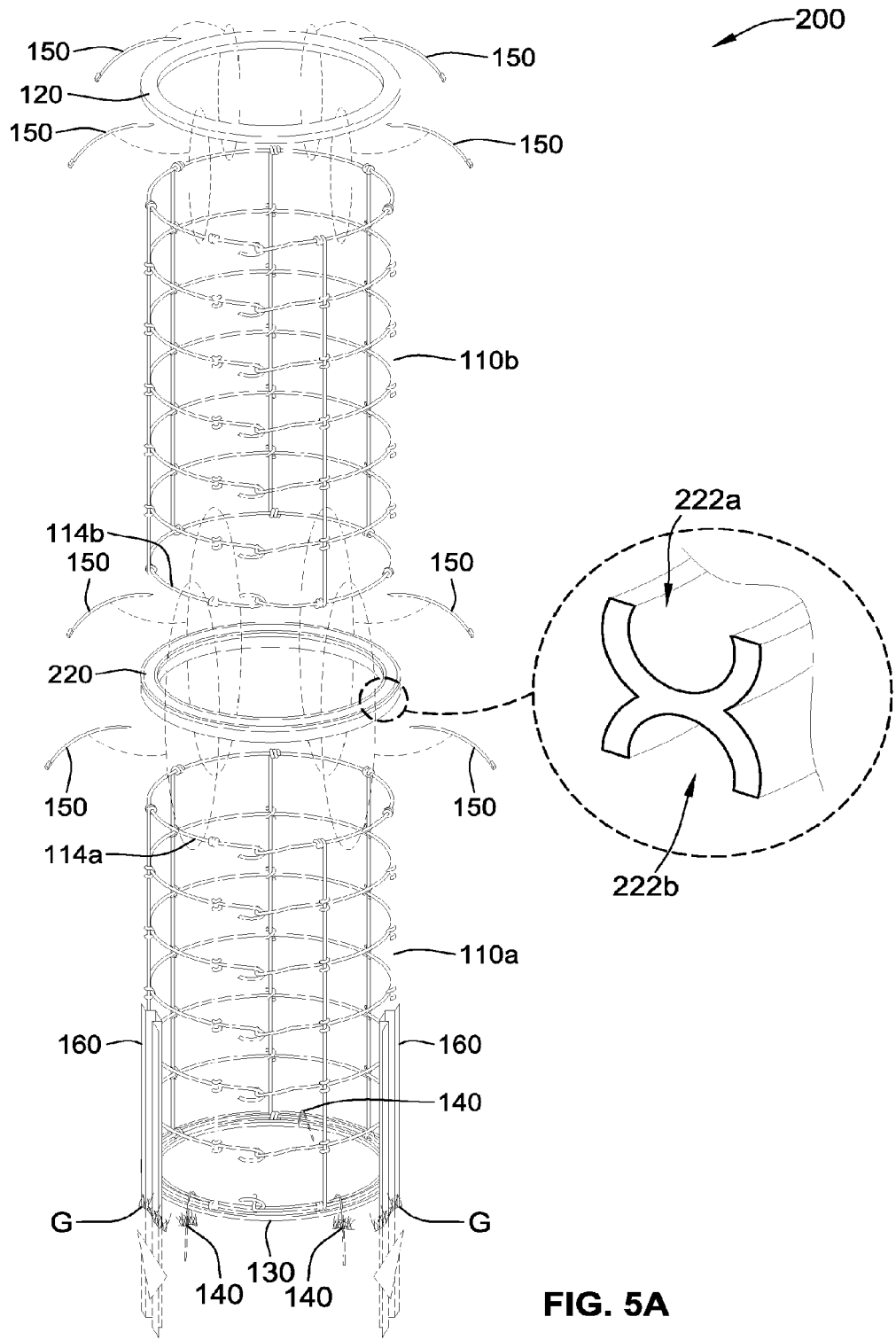
FIG. 5A is a partially exploded perspective view of another alternative plant cage kit having two wire grid portions according to some aspects of the present disclosure.

Now referring to FIG. 5A, a plant cage kit 200 similar to the plant cage kit 100 is shown, where like reference numbers are used for like components. The plant cage kit 200 includes a first wire grid portion 110a, a second wire grid portion 110b, a top ring 120, an intermediate ring 220, a bottom ring 130, a plurality of cage stakes 140, a plurality of fastening elements 150, and two garden stakes 160.

The plant cage kit 200 mainly differs from the plant cage kit 100 in that the plant cage kit 200 includes two separate and distinct portions of wire grids 110a and 110b and an intermediate ring 220 positioned therebetween. The first and the second portions of wire grid 110a and 110b (FIG. 5A) are identical to the wire grid 110 (FIG. 1A). Alternatively, the first and the second portions of wire grid 110a and 110b are about half of the height of the wire grid 110, but are identical in all other respects (e.g., the spread distances $SD_w$ and $SD_h$ remain the same). Such an implementation having two relatively shorter wire grids 110a, 110b allows for a shipping container to be used that is about half the length (e.g., see length $L_{SC}$ in FIG. 6) of the shipping container containing the plant cage kit 100.

As shown in FIG. 5A, the intermediate ring 220 has a generally H-shaped cross-section forming a first channel 222a and an opposing second channel 222b. The first and the second channels 222a, 222b have the same, or similar, dimensions as the channels 122, 132 (FIG. 2A). In the fully assembled configuration of the plant cage kit 200 (not shown), the bottom one of the second wires 114b of the second wire grid portion 110b is positioned substantially and/or fully within the first channel 222a of the intermediate ring 220. Similarly, in the fully assembled configuration of the plant cage kit 200 (not shown), the top one of the second wires 114a of the first wire grid portion 110a is positioned substantially and/or fully within the second channel 222b of the intermediate ring 220. Once so positioned, fastening elements 150 can be secured therearound to further aid in coupling the first and the second wire grid portions 110a, 110b together.

In an implementation where the plant cage kit 200 has a relatively larger height than the plant cage kit 100 (e.g., about twice the overall height), the two garden stakes 160 shown in FIG. 5A (e.g., instead of a single garden stake 160) can be installed to add additional rigidity to the relatively taller plant cage kit 200 in the same manner as the single garden stake 160 was installed and discussed relative to the plant cage kit 100.

Figure 3B:
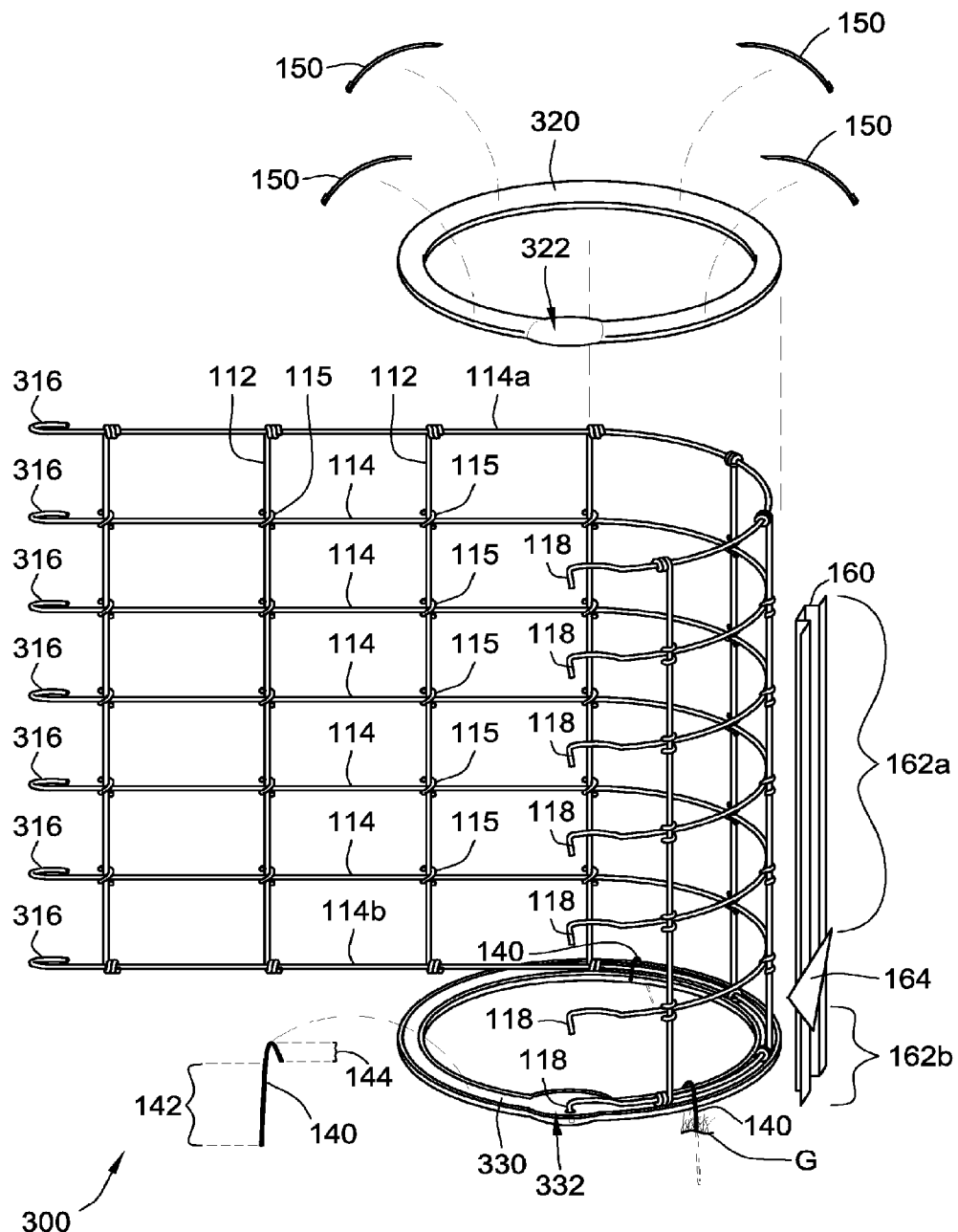
FIG. 3B is a partially exploded perspective view of the plant cage kit of FIG. 4B.
Figure 4B:
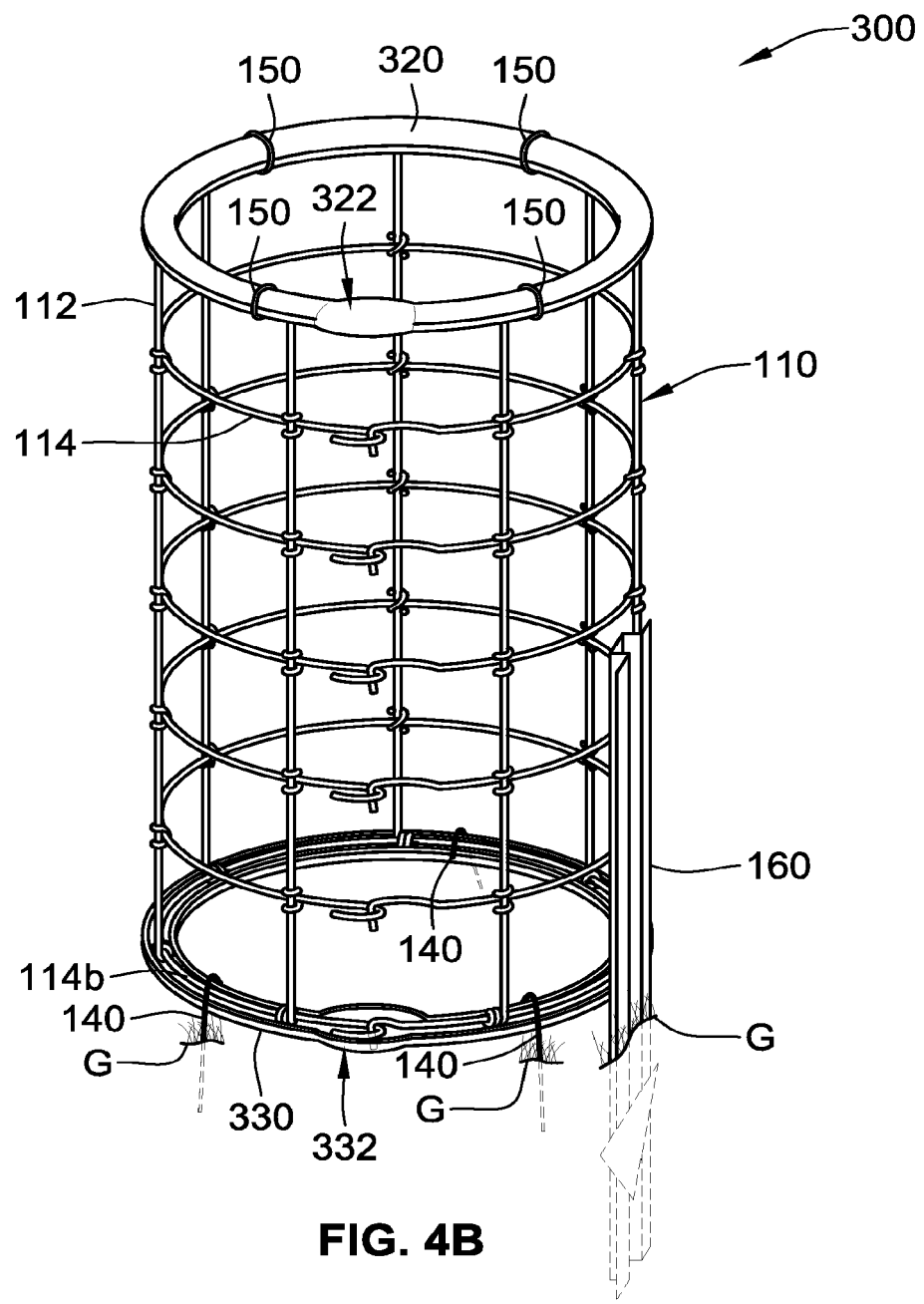
FIG. 4B is an assembled perspective view of an alternative plant cage kit according to some aspects of the present disclosure.

Now turning to the implementation shown in FIGS. 1B, 2B, 3B, and 4B, where like reference numbers are used for like components and like dimensional references are used for like dimensions. A plant cage kit 300 (FIGS. 3B, 4B) includes a wire grid 310 (FIGS. 1B, 3B, 4B), a top ring 320 (FIGS. 2B, 3B, 4B), a bottom ring 330 (FIGS. 2B, 3B, 4B), a plurality of cage stakes 140 (FIGS. 3B, 4B), a plurality of fastening elements 150 (FIGS. 3B, 4B), and a garden stake 160 (FIGS. 3B, 4B). While the plant cage kit 300 is shown in its assembled configuration in FIG. 4b, the plant cage kit 300 is shipped and/or shippable in a shipping configuration/unassembled configuration (e.g., shown in FIG. 6) where the components of the plant cage kit 300 are generally flat and stacked making the plant cage kit 300 easier for a consumer to transport and/or carry.

The wire grid 310 is similar to the wire grid 110 in that the first wires 112 of the wire grid 310 are positioned in a first plane (e.g., the X-Y plane); however, unlike the plant cage kit 100, the hooks 318 of the second wires 114 of the plant cage kit 300 are generally positioned in the first plane (e.g., the X-Y plane) and each of the loops 316 of the second wires 114 is generally positioned in a corresponding second plane (e.g., a X-Z plane) that are each generally perpendicular to the first plane (e.g., the X-Y plane). With reference to FIGS. 3A and 4A, the positioning of the loops 316 and hooks 318 in such generally perpendicular planes aids in the maintaining of the wire grid 310 in its assembled configuration (FIG. 4B); however, the different positioning of the hooks 318 and loops 316 (as compared to the plant cage kit 100) requires a different configuration for the top and bottom rings 320, 330 as shown in FIG. 2B and described below.

The top ring 320 is similar to the top ring 120 except that the top ring 320 includes a bulge portion 322. The bulge portion 322 is generally a widen portion of the channel 122 positioned to accommodate the loop 316 of the top second wire 114a of the wire grid 310 in the assembled configuration (FIG. 4B). Such an accommodation of the loop 316 is necessary in the implementation of FIGS. 1B, 2B, 3B, and 4B, because the loops 316 protrude in X-Z planes (not in a X-Y plane as in the plant cage kit 100). Further, in some implementations, the bulge portion 322 itself and/or the engagement of the loop 316 with the bulge portion 322 adds rigidity to the plant cage kit 300 in the assembled configuration (FIG. 4B).

The bottom ring 330 is similar to the bottom ring 130 except that the bottom ring 330 includes a bulge portion 332 and an aperture 335. The bulge portion 332 is generally a widen portion of the channel 132 positioned to accommodate the loop 316 of the bottom second wire 114b as the wire grid 310 in the assembled configuration (FIG. 4B). The aperture in the bulge portion 332 of the channel 132 is necessary in the implementation of FIGS. 1B, 2B, 3B, and 4B, because the hook 318 of the bottom second wire 114b protrudes downward in the X-Y plane (not in the Y-Z plane). Additionally, such an accommodation of the loop 316 in the bulge portion 332 is necessary in the implementation of FIGS. 1B, 2B, 3B, and 4B, because the loops 316 protrude in X-Z planes (not in a X-Y plane). Further, in some implementations, the bulge portion 332 itself and/or the engagement of the loop 316 with the bulge portion 332 adds rigidity to the plant cage kit 300 in the assembled configuration (FIG. 4B). Moreover, as the hook 318 of the bottom second wire 114b protrudes through the aperture 335 (best shown in FIG. 3B), the hook 318 engages with the ground G, which aids in maintaining the positioning of the plant cage kit 300 and supporting a plant therein. In some such implementations, the engagement of the hook 318 of the bottom second wire 114b can replace the need for one of the cage stakes 140.

Assembly of the plant cage kit 300 is similar to the assembly of the plant cage kit 100 except that the hook 318 of the bottom second wire 114b is positioned through the aperture 335 in the bulge portion 332 of the bottom ring 330 after the wire grid 310 is fully converted/bent from its flatten configuration (FIG. 1B) to its curved configuration (FIG. 4B).

Figure 5B:
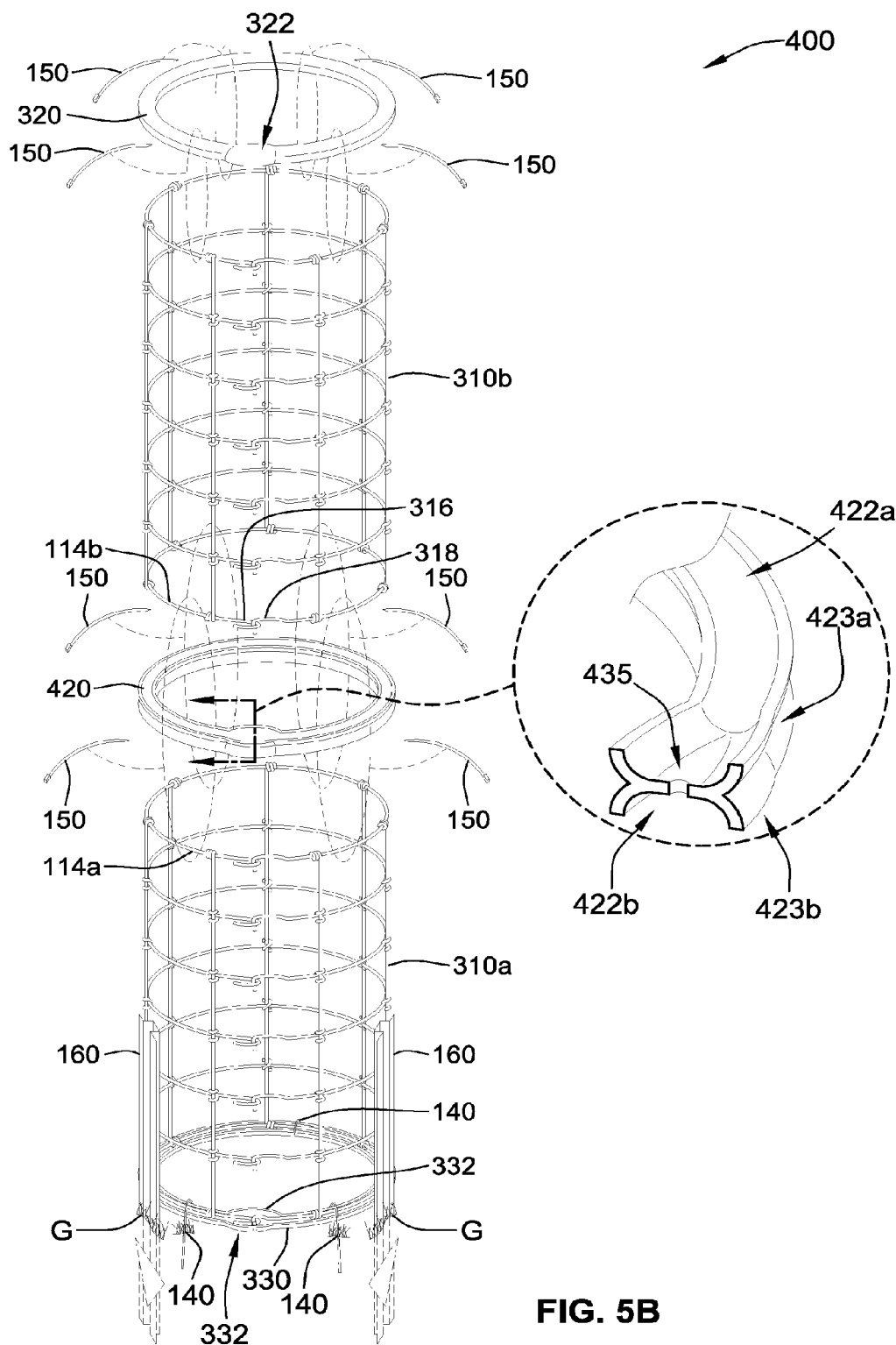
FIG. 5B is a partially exploded perspective view of yet another alternative plant cage kit having two wire grid portions according to some aspects of the present disclosure.

Now referring to FIG. 5B, a plant cage kit 400 similar to the plant cage kit 300 is shown, where like reference numbers are used for like components. The plant cage kit 400 includes a first wire grid portion 310a, a second wire grid portion 310b, a top ring 320, an intermediate ring 420, a bottom ring 330, a plurality of cage stakes 140, a plurality of fastening elements 150, and two garden stakes 160.

Figure 1B:
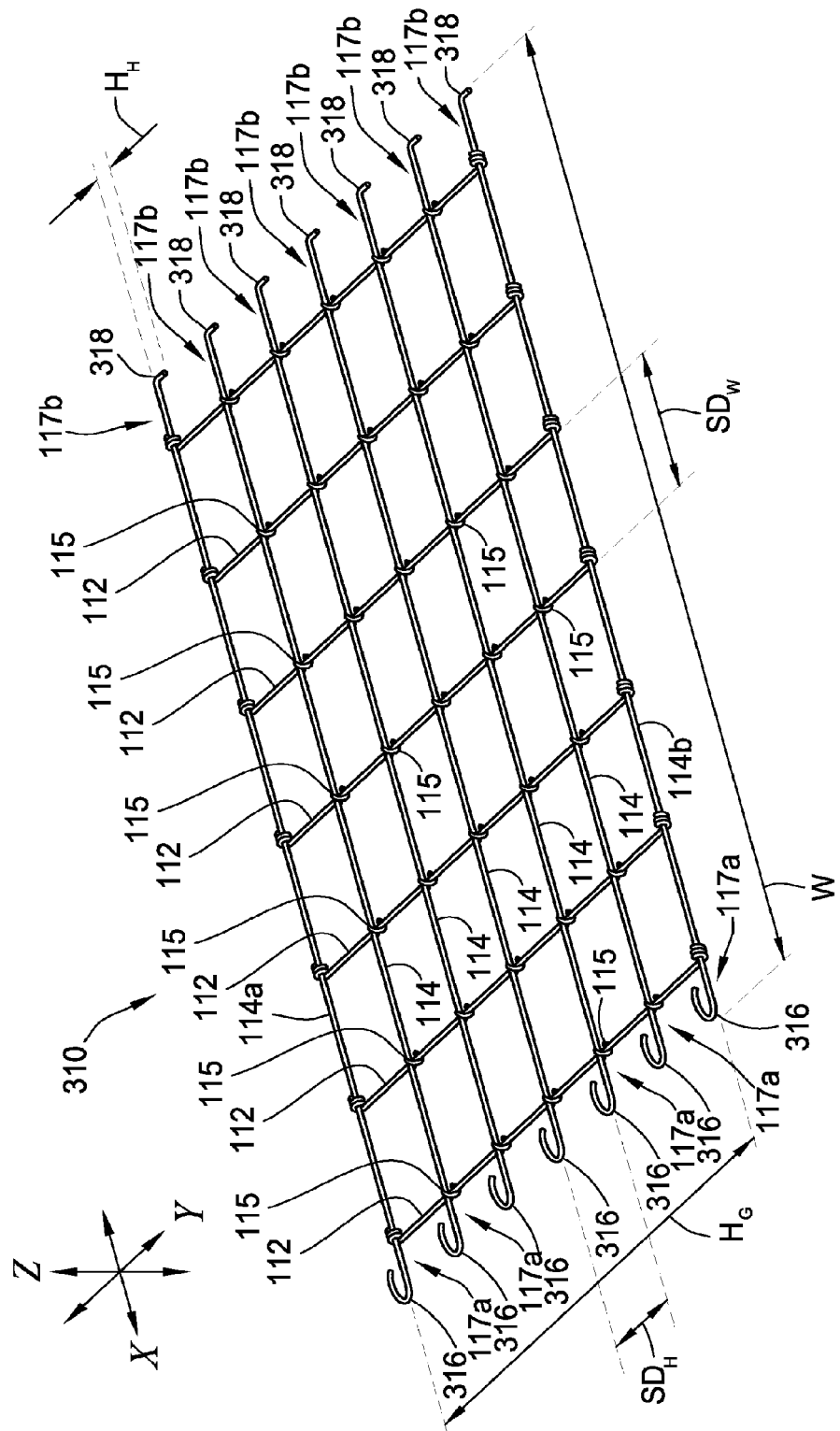
FIG. 1B is a perspective view of a wire grid of an alternative plant cage kit of FIG. 4B according to some aspects of the present disclosure.

The plant cage kit 400 mainly differs from the plant cage kit 300 in that the plant cage kit 400 includes two separate and distinct portions of wire grids 310a and 310b and an intermediate ring 420 positioned therebetween. The first and the second portions of wire grid 310a and 310b (FIG. 5B) are identical to the wire grid 310 (FIG. 1B). Alternatively, the first and the second portions of wire grid 310a and 310b are about half of the height of the wire grid 310, but are identical in all other respects (e.g., the spread distances $SD_s$ and $SD_h$ remain the same). Such an implementation having two relatively shorter wire grids 310a, 310b allows for a shipping container to be used that is about half the length (e.g., see length $L_{SC}$ in FIG. 6) of the shipping container containing the plant cage kit 300.

As shown in FIG. 5B, the intermediate ring 420 has a generally H-shaped cross-section forming a first channel 422a and an opposing second channel 422b. The first and the second channels 422a, 422b have the same, or similar, dimensions as the channels 122, 132 (FIG. 2A), except that the first channel 422a includes a bulge portion 423a and an aperture 435 therein and similarly the second channel 422b includes a bulge portion 423b and the aperture 435 therein. In the fully assembled configuration of the plant cage kit 400 (not shown), the bottom second wire 114b of the second wire grid portion 310b is positioned substantially and/or fully within the first channel 422a of the intermediate ring 420—such that the loop 316 of the bottom second wire 114b of the second wire grid portion 310b is positioned in the first bulge portion 423a and such that the hook 318 of the bottom second wire 114b of the second wire grid portion 310b is positioned through the aperture 435. Further, in the fully assembled configuration of the plant cage kit 400 (not shown), the top one of the second wires 114a of the first wire grid portion 310a is positioned substantially and/or fully within the second channel 422b of the intermediate ring 420—such that the loop 316 of the top second wire 114a of the first wire grid portion 310a is positioned in the second bulge portion 423b. Once so positioned, fastening elements 150 can be secured therearound to further aid in coupling the first and the second wire grid portions 310a, 310b together.

Figure 6:
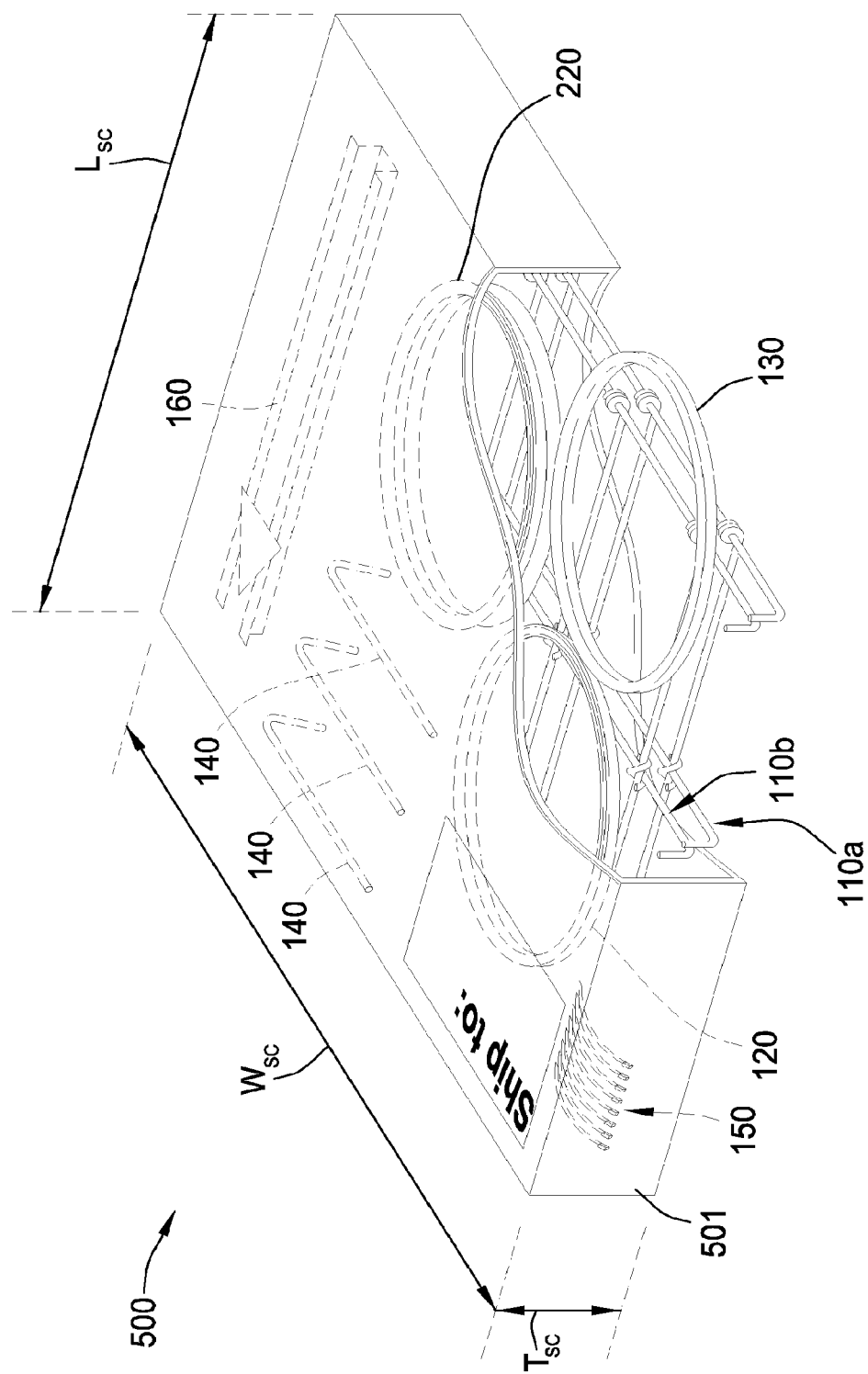
FIG. 6 is a perspective view of a plant cage kit in a shipping configuration according to some aspects of the present disclosure.

Now referring to FIG. 6, a plant cage kit 500, the same as, or similar to, the plant cage kit 200, is shown in its shipping configuration (as compared to an assembled configuration shown in, e.g., FIG. 5A). Specifically, a shipping container 501 (e.g., a cardboard box, etc.) includes a first wire grid portion 110a, a second wire grid portion 110b, a top ring 120, an intermediate ring 220, a bottom ring 130, a plurality of cage stakes 140, a plurality of fastening elements 150, and a garden stake 160. As shown, all of the components of the plant cage kit 500 conveniently fit into the shipping container 501 having a length, $L_{SC}$, a width, $W_{SC}$, and a thickness, $T_{SC}$. In some implementations, the length, $L_{SC}$, is between about one foot and about four feet. In some implementations, the length, $L_{SC}$, is about 1.6 feet. In some implementations, the length, $L_{SC}$, is about 3.1 feet. In some implementations, the width, $W_{SC}$, is between about four feet and about five feet. In some implementations, the width, $W_{SC}$, is about 4.6 feet. In some implementations, the thickness, $T_{SC}$, is between about four inches and about eight inches. In some implementations, the thickness, $T_{SC}$, is about five inches.

As shown in the figures and as described herein, the rings (e.g., rings 120, 130, 220, 320, 330, 420) are shown as being unitary and/or monolithic parts. Alternatively, any of the rings of the present disclosure can be made of two or more parts coupled together (e.g., three parts, four parts, ten parts, etc.). For example, ring 120 can have a first half and a second half where the first and the second halves are configured to be coupled together to form a single ring. The parts of the multiple part rings can be coupled together using any known coupling mechanism, such as, for example, a katch mechanism, a button and tab with a hole mechanism, a snap fit mechanism, a press fit mechanism, etc. Further, such multiple part rings can be beneficial when using the plant cage kit with, for example, a tree that grows to be taller than the plant cage kit. In such a situation, removal of the ring would require cutting or breaking the ring and/or trying to slide the ring over the top of the tree, which would be difficult.

Each of the above implementations and obvious variations thereof is contemplated as falling within the spirit and scope of the claimed invention, which is set forth in the following claims.

What is claimed is:

1. A plant cage kit having an assembled configuration, the plant cage kit comprising:
    a wire grid having a plurality of first spaced-apart wires and a plurality of second spaced-apart wires, each of the second wires being coupled to each of the first wires to form the wire grid, each of at least some of the second wires having a first end and a second end opposing the first end, the first end of each of the at least some of the second wires being formed into a loop or a hook and the second end of each of the at least some of the second wires being formed into a hook or loop, the hook or loop of each second wire engaging the loop or hook of the same second wire when the plant cage kit is in the assembled configuration such that the wire grid completes a circumference about a generally vertical axis;
    a first piece formed as a first ring having a generally U-shaped cross-section portion forming a channel such that in the assembled position a first outermost one of the second wires is substantially positioned within the channel of the first ring;
    a second piece formed as a second ring having a generally U-shaped or H-shaped cross-section portion forming at least one channel such that in the assembled position a second outermost one of the second wires is substantially positioned within the at least one channel of the second ring, where in the assembled configuration the first ring and the second ring aid in providing structural rigidity to the wire grid and maintaining the wire grid in a generally cylindrical shape;
    a plurality of cage stakes, each having a body portion and a hook portion, where in the assembled configuration each of the cage stakes is configured to hold the first or the second ring in secure communication with a ground surface on which the first or second ring and the wire grid rest, where the body portion is positioned below a grade of the ground surface and the hook portion is positioned over and engages an upper portion of the first or second ring;
    a garden stake having a first shaft portion, a second shaft portion, and a stopper portion positioned between the first and the second shaft portions, the garden stake being configured to be partially implanted into the ground surface on which the plant cage kit is positioned such that the first shaft portion and the stopper portion are below a grade of the ground surface, and where in the assembled position the garden stake is fastened to the wire grid and aids in supporting the wire grid against lateral forces; and
    a plurality of fastening elements, where in the assembled configuration at least some of the fastening elements are configured to retain the first or second outermost one of the second wires within the channel or the at least one channel of the first or second ring and at least one of the fastening elements is configured to secure the second shaft portion of the garden stake to the wire grid.

2. The plant cage kit of claim 1, where in the assembled configuration, the plant cage kit has a height between about 1.5 feet and about 4 feet and a diameter between about 1.2 feet and about 1.6 feet.

3. The plant cage kit of claim 1, wherein each of the plurality of first spaced-apart wires is spaced apart by approximately six inches, and wherein each of the plurality of second spaced-apart wires is spaced apart by approximately six inches.

4. The plant cage of claim 1, where each of the hooks or loops is generally U-shaped.

5. The plant cage of claim 1, where the first end of each second wire forms a hook and the second end of each second wire forms a hook.

6. The plant cage of claim 1, where the second piece has a generally H-shaped cross section forming two channels.

7. The plant cage of claim 1, where the fastening elements include any combination of one or more of a cable tie, a wire, a string, or tape.

* * * * *